C. LEAN.
SIGNALING APPARATUS.
APPLICATION FILED APR. 1, 1911.

1,094,368.

Patented Apr. 21, 1914.

Inventor:
Clement Lean
by Frank S. Ahaleman, atty.

UNITED STATES PATENT OFFICE.

CLEMENT LEAN, OF LONDON, ENGLAND, ASSIGNOR TO GRAHAM & LATHAM LIMITED, OF WESTMINSTER, ENGLAND, A CORPORATION OF ENGLAND.

SIGNALING APPARATUS.

1,094,368.      Specification of Letters Patent.      Patented Apr. 21, 1914.

Application filed April 1, 1911. Serial No. 618,353.

*To all whom it may concern:*

Be it known that I, CLEMENT LEAN, a subject of the King of the United Kingdom of Great Britain and Ireland, residing at Thanet House, 231 Strand, London, W. C., England, have invented a new and useful Improved Signaling Apparatus, of which the following is a specification.

This invention relates to signaling apparatus and consists of apparatus comprising a support, mirrors revolubly mounted thereon and a roof or shield arranged above the latter and preferably having a black under surface.

One embodiment of apparatus according to the present invention is illustrated by way of example, in the accompanying drawings, in which:—

Figure 1:
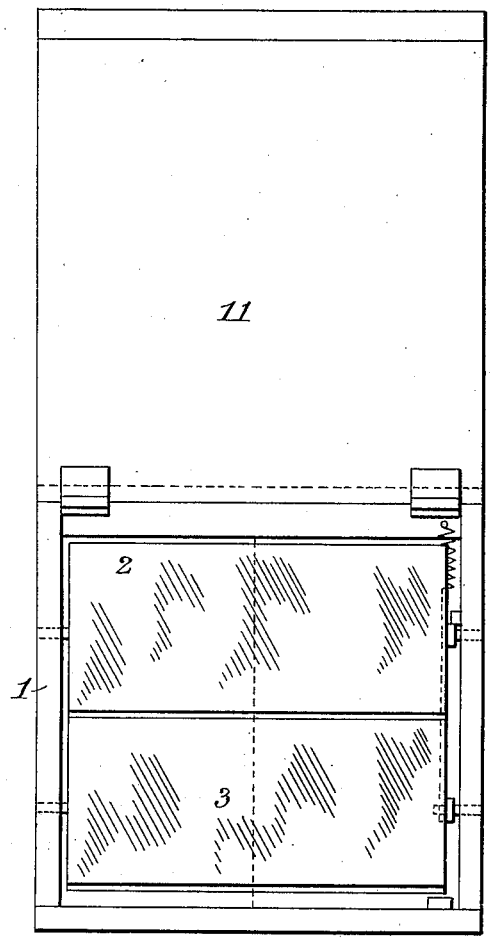
Figure 2:
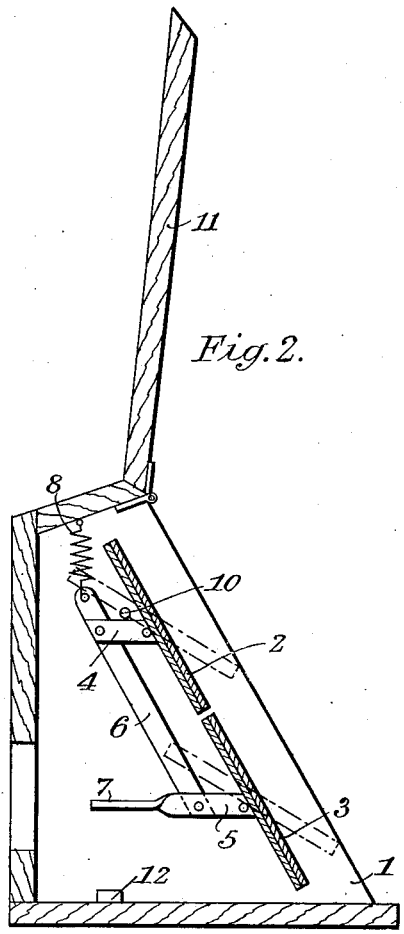

Figure 1 is a front elevation and Fig. 2 a transverse section.

1 is a case the sides of which form a support for two mirrors 2, 3 revolubly mounted thereon. Said mirrors are interconnected by arms 4, 5 and a link 6, the arm 5 being extended to form a finger-piece 7 situated opposite an opening in the left-hand side of the case as seen in Fig. 2. The whole arm 5 thus forms a key. A spring 8 is fixed at one end to the upper end of the link 6 and at the other end to the roof of the case the under surface of which is preferably black and which constitutes with or without the lid 11 when fully open a shield for the top mirror when in the position indicated by dots and dashes in Fig. 2. The spring normally maintains the mirrors in the position shown, in which the arm abuts against the stop 10. When the apparatus is in use the lid 11 is maintained in the open position indicated, by any suitable means.

12 is a stop for the finger-piece 7 of the arm or key 5 when depressed.

The mode of using this apparatus is as follows:—The apparatus is held with the base of the case in a substantially horizontal position and the mirrors are directed toward the observer who consequently sees an image of the sky or clouds. The arm or key 5 is then depressed until the finger-piece 7 comes against the stop 12, the result being that the mirrors are turned into the position indicated by dotted lines in which an image of the roof or lid is reflected to the observer. As said roof and lid are preferably black the bright reflection from the sky or clouds disappears and is replaced by apparent darkness due to the shielding action of said roof or lid. On releasing the key or arm 5 the spring returns the mirrors to the position shown and the reflection of the sky or clouds reappears. The apparatus while in operation may be supported on a tripod or be suspended by a strap passing over the shoulders of the operator.

What I claim as my invention and desire to secure by Letters Patent is:—

1. Signaling apparatus comprising a movable mirror, a dark shield which is adjacent to the mirror and the image of which is adapted to be reflected to the observer by the mirror, and means for movably mounting the mirror whereby its position may be changed with relation to the dark shield.

2. Signaling apparatus comprising a mirror, a dark shield adjacent to the mirror, means for mounting the mirror to reflect to the observer the image of said dark shield, and means for moving the mirror out of position for reflecting to the observer such image.

3. Signaling apparatus comprising a mirror, a substantially dark shield adjacent to the mirror, means for mounting the mirror to reflect to the observer the image of the dark shield, and key mechanism for moving the mirror out of position for reflecting to the observer such image.

4. Signaling apparatus comprising a mirror, a substantially dark shield adjacent to the mirror, means for mounting the mirror to reflect to the observer the image of the substantially dark shield, and spring influenced key-mechanism for moving the mirror out of position for reflecting to the observer such image.

In testimony whereof I have signed my name to this specification in the presence of two subscribing witnesses.

CLEMENT LEAN.

Witnesses:
    F. A. POWELL,
    J. W. MASTRITON.